US012620844B2

(12) United States Patent
Marchal

(10) Patent No.: US 12,620,844 B2
(45) Date of Patent: May 5, 2026

(54) STATOR BODY AND METHOD FOR ASSEMBLING SUCH A STATOR BODY

(71) Applicants: RENAULT S.A.S., Boulogne Billancourt (FR); WHYLOT, Cambes (FR)

(72) Inventor: Nicolas Marchal, Saint Cyr l'Ecole (FR)

(73) Assignees: AMPERE SAS, Boulogne-Billancourt (FR); WHYLOT, Cambes (FR)

( * ) Notice: Subject to any disclaimer, the term of this patent is extended or adjusted under 35 U.S.C. 154(b) by 333 days.

(21) Appl. No.: 18/573,242

(22) PCT Filed: Jun. 24, 2022

(86) PCT No.: PCT/EP2022/067423
§ 371 (c)(1),
(2) Date: Dec. 21, 2023

(87) PCT Pub. No.: WO2022/269075
PCT Pub. Date: Dec. 29, 2022

(65) Prior Publication Data
US 2024/0348109 A1 Oct. 17, 2024

(30) Foreign Application Priority Data
Jun. 25, 2021 (FR) ...................................... 2106814

(51) Int. Cl.
*H02K 1/14* (2006.01)
*H02K 15/022* (2025.01)
*H02K 21/24* (2006.01)
(52) U.S. Cl.
CPC ........... *H02K 1/148* (2013.01); *H02K 15/022* (2013.01); *H02K 21/24* (2013.01)

(58) Field of Classification Search
CPC ...... H02K 1/148; H02K 15/022; H02K 1/182; H02K 21/24
USPC ...................................................... 310/216.009
See application file for complete search history.

(56) References Cited

FOREIGN PATENT DOCUMENTS

| JP | 2013090461 A | 5/2013 |
| WO | 2014045247 A2 | 3/2014 |
| WO | 2021003510 A2 | 1/2021 |

OTHER PUBLICATIONS

International Search Report for PCT/EP2022/067423, mailed Oct. 24, 2022, 4 pages.
Written Opinion of the ISA for PCT/EP2022/067423, mailed Oct. 24, 2022, 8 pages.

*Primary Examiner* — Terrance L Kenerly
*Assistant Examiner* — Theodore L Perkins
(74) *Attorney, Agent, or Firm* — NIXON & VANDERHYE

(57) ABSTRACT

A stator body for an electric machine, including: —at least one fixing support centered on a longitudinal axis, —teeth which are designed to accept coils of electrically conducting wire and which are uniformly distributed about the longitudinal axis, and—fixing means each suitable for fixing one of the teeth to the fixing support. Each fixing means includes: —at least one first key at least partially housed in a first keyway provided in the tooth, —at least one second key at least partially housed in a second keyway provided in the fixing support, and—at least one immobilizing element designed to immobilize the first key with respect to the second key.

12 Claims, 5 Drawing Sheets

STATOR BODY AND METHOD FOR ASSEMBLING SUCH A STATOR BODY

This application is the U.S. national phase of International Application No. PCT/EP2022/067423 filed Jun. 24, 2022, which designated the U.S. and claims priority to FR Patent Application No. 2106814 filed Jun. 25, 2021, the entire contents of each of which are hereby incorporated by reference.

BACKGROUND OF THE INVENTION

Technical Field of the Invention

The present invention generally relates to the field of electric machines.

It relates more particularly to a stator body for an electric machine, comprising:
- at least one fixing support centred on a longitudinal axis,
- teeth which are designed to accept coils of electrically conducting wire and which are uniformly distributed about the longitudinal axis, and
- fixing means each suitable for fixing one of said teeth to the fixing support.

The invention finds a particularly advantageous application in an axial flux electric machine, although it also applies to radial flux electric machines.

Description of the Prior Art

An electric or hybrid motor vehicle includes a powertrain which comprises an electric machine.

The electric machine includes a rotor that is mounted on an output shaft, which is connected to the drive wheels of the vehicle.

For example, the electric machine can be of the axial flux type and include a casing in two parts, which houses a disk-shaped rotor flanked by two stators. The stators are then slightly spaced apart on either side of the rotor to avoid any friction when the rotor rotates. Thus, on each side of the rotor there is a space called an "air gap".

The performance of the electric machine depends on the value of these air gaps (it must be minimal), their consistency all around the axis of rotation of the rotor, and the symmetry of these air gaps on either side of the rotor. The slightest error in geometry has consequences on the performance of the motor and its lifespan. For example, it is understood that a difference in values between the two air gaps causes the rotor to be attracted by the nearest stator. This force can be significant. It can also be cyclical and cause fatigue of the materials making up the electric machine.

These problems are inherent to the very concept of an axial flux electric machine.

It is therefore important to ensure that the stators are well assembled and securely fixed in the casing.

The major problem which then arises concerns the fixing of the teeth around which the coils of electrical wires are wound.

Indeed, the methods considered for achieving this fixing are either very bulky, unreliable, or poorly resistant to vibrations.

PRESENTATION OF THE INVENTION

In order to overcome the aforementioned disadvantages of the prior art, the present invention proposes to fix the teeth by means of keys.

More particularly, according to the invention, provision is made of an electric machine as defined in the introduction, wherein each fixing means comprises:
- at least one first key at least partially housed in a first keyway provided in the tooth,
- at least one second key at least partially housed in a second keyway provided in the fixing support, and
- at least one immobilising element designed to immobilise the first key with respect to the second key.

Thus, thanks to the invention, it is possible to bring the keys into the keyways then place each tooth on the fixing support such that the keys overlap. Therefore, it is possible to fix the keys together in order to immobilise the tooth against the fixing support.

The use of several keys allows the tooth to be assembled to the fixing support without requiring a lot of space.

Thus, if the fixing support has a flat area wherein the keyways are located, and a rim which rises around the flat area, it is possible to engage the keys taking advantage of the reduced space between the rim and the teeth, thanks to the reduced length of the keys used.

Preferably, each key is housed in one of the two keyways only. In other words, the first key does not extend into the second keyway, and vice versa.

Other advantageous and non-limiting features of the electric machine in accordance with the invention, taken individually or in all technically possible combinations, are as follows:
- each first and second keyway has a bottom and two side walls inclined towards each other which together delimit an elongated orifice of less width than the bottom, the orifice of the first keyway being superimposed on the orifice of the second keyway;
- the first keyway opens on either side of the tooth;
- the first key projects on either side of the tooth;
- each immobilising element is accessible from the side of the tooth;
- two separate second keys, housed in the same second keyway or in two second coaxial keyways are provided;
- the immobilising element is designed to exert a tensile force from the first key towards the second key;
- the immobilising element includes a plastically deformable part which is integrally formed with the second key;
- the first key delimits a passage for the plastically deformable part, on the edge of which the plastically deformable part is designed to be crimped;
- the second keyway is extended by an insertion ramp the cross section of which gradually widens from the second keyway;
- the fixing support forms part of a casing of a stator;
- each fixing means also includes a relief which extends projecting or recessed from the fixing support and to which is hooked the tooth.

The invention also relates to an electric machine including a rotor and two stator bodies as mentioned above, located on either side of the rotor.

It also relates to a method for assembling a stator body as mentioned above, comprising:
- a step of inserting the first key into the first keyway provided in the tooth,
- a step of engaging each second key in the second keyway provided in the fixing body,
- after the insertion step, a step of placing the tooth resting against the fixing support, so that the first keyway is superimposed above the second keyway, and after the placement step and the engagement step, a step of immobilising the first key on the second key using the immobilising element.

Preferably, the placement step can be implemented before or after the engagement step.

Advantageously, the immobilisation step is implemented by crimping the immobilising element.

Of course, the different features, variants and embodiments of the invention can be associated with each other in various combinations as long as they are not incompatible or exclusive of each other.

BRIEF DESCRIPTION OF THE DRAWINGS

The description which follows with reference to the appended drawings, given as non-limiting examples, will clarify what the invention consists of and how it can be carried out.

On the appended drawings.

DETAILED DESCRIPTION

As a preliminary point, it should be noted that the identical elements of the invention represented in the different figures will, as far as possible, be referenced by the same reference signs. Similar but slightly different elements will in turn, as far as possible, be referenced by reference signs having the same radical but ending with different letters (for example 110A and 110B).

Figure 1:
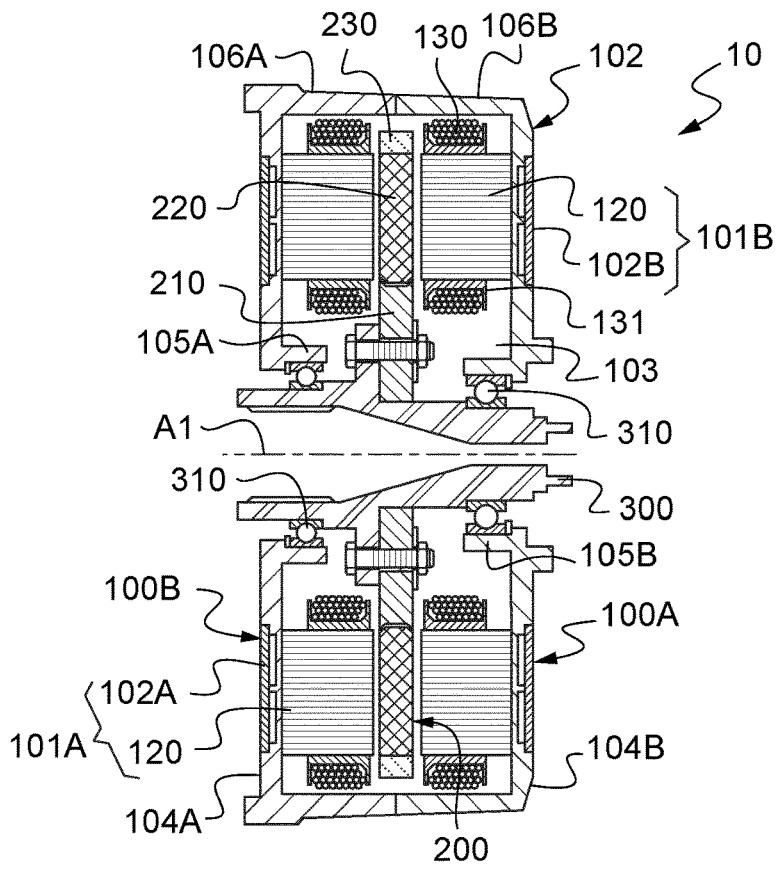
FIG. 1 is a schematic sectional view of an electric machine in accordance with the invention.

FIG. 1 shows an electric machine of a powertrain which can in particular be installed in an electric or hybrid propulsion motor vehicle.

The electric machine 10 could be of the radial flux type. However, preferably, it is of the axial flux type. Therefore, it includes at least one rotor 200 and at least one stator.

Here, it includes a rotor 200 flanked by two stators 100A, 100B.

This electric machine 10 includes a hollow casing 102 in two parts bolted to each other, hereinafter called half-casings 102A, 102B, which delimits a housing 103 inside which the rotor 200 is located.

The rotor 200 here has the shape of a disc pierced in its centre. It includes a central hub 210 in the shape of a star and a peripheral hoop 230 which hold together magnets 220 (made in one-piece or formed from a plurality of unit magnets) uniformly distributed about an axis of rotation A1.

The central hub 210 and the hoop 230 are made of non-magnetic materials, for example composite material. The hoop allows, when the rotor rotates, to take up the centrifugal forces of the magnets 220 in order to preserve the cohesion of the rotor 200 at high speed.

The central hub 210 is bolted to an output shaft 300 which extends axially along the axis of rotation A1 and which is connected to the drive wheels of the motor vehicle.

The stators 100A, 100B are placed on either side of the rotor 200 and they are designed so that the electric machine 10 has the smallest possible footprint.

They each include teeth 120 which are fixed on a fixing support so as to be uniformly distributed about the axis of rotation A1, and coils 130 of electrical wires mounted on the teeth 120 and connected to an electrical power supply so as to be able to rotate the rotor 200.

It will be noted in FIG. 1 that the coils 130 of electric wires here include a bobbin 131 around which the electric wire is wound, which protects the electric wire.

The fixing supports on which the teeth 120 are fixed are intended to be fixed in the casing 102.

Here, and preferably, these fixing supports are formed by the two half-casings 102A, 102B, which allows to reduce the number of components and the footprint of the electric machine 10. Thus the teeth are directly fixed on the casing 102.

Each half-casing 102A, 102B then forms, with the teeth 120 that it supports, a "stator body 101A, 101B".

Each stator body 101A, 101B further forms, with the coils 130 of electric wires, a "stator 100A, 100B".

It will be noted here that the casing is made of a metallic material and that the teeth are formed from a superposition of assembled metal sheets.

The invention relates more precisely to the stator bodies 101A, 101B, which can then be described in more detail.

Figure 2:
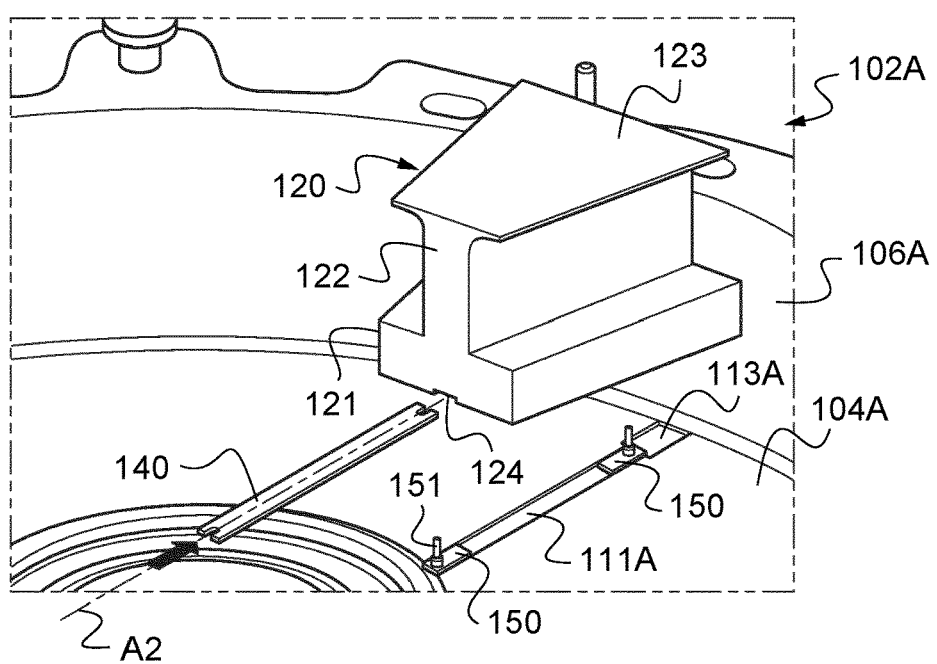
FIG. 2 is a schematic view of a tooth and part of a fixing support in accordance with a first embodiment of the electric machine of FIG. 1, before assembly and placement of the key of the tooth and after installation of the keys of the fixing support.

As shown in FIG. 1, each half-casing 102A, 102B has a substantially flat and circular bottom 104A, 104B, which is pierced in its centre by a passage opening for the output shaft 300 (see also FIG. 2). Alternatively, only one of these half-casings could be pierced with such an opening, the other being entirely closed.

Each bottom 104A, 104B is bordered internally, along this passage opening, by an internal flange 105A, 105B shaped to accept, on its cylindrical internal face, a ball bearing 310 wherein the output shaft 300 is mounted.

Each bottom 104A, 104B is also bordered along its circumference by a peripheral rim 106A, 106B which rises to the peripheral circumference of the other half-casing 102A, 102B, so as to hermetically close the chamber 103.

As shown in FIG. 2, each tooth 120 has a base 121 in the shape of a thick isosceles trapezoid, a body 122 also in the shape of a thicker isosceles trapezoid, of the same height but narrower than the trapezoid formed by the base 121, and finally a head 123 which gradually widens on either side of the body 122.

Each tooth 120 thus delimits, on either side of its body 122, a keyway around which the winding 130 of electric wire can be placed so that the latter is retained on one side by the base 121 and on the other by the head 123.

The teeth 120 are shaped so that the distance separating them from the rotor 200, called air gap, is as small as possible.

The invention then relates more precisely to the means which allow to fix the teeth 120 on each half-casing 102A, 102B.

These fixing means are here designed to be rigid so that the air gap does not vary.

They are further designed to be able to be installed in the reduced space defined between the peripheral rim 106A, 106B and the internal flange 105A, 105B of the half-casing 102A, 102B. Indeed, the disadvantage of using the casing to directly fix the teeth is that the space available to carry out the fixing is very small.

According to the invention, this fixing is then carried out by means of several keys.

The fixing means used to fix each tooth on each part of the casing 102 are all identical. Consequently, in the remainder of this presentation, focus will exclusively be on the fixing of any one of the teeth 120 on any one of the half-casings 102A. These two elements are shown in FIG. 2.

To ensure this fixing, as shown for example in FIG. 2, the base 121 of the tooth 120 has a keyway 124 recessed in its face in contact with the bottom 104A of the half-casing 102A.

This keyway 124 extends in length along an axis which is radial with respect to the axis of rotation A1 (that is to say perpendicular to the latter), and which is hereinafter called radial axis A2.

The keyway 124 is profiled along this radial axis A2, that is to say that any cross section of this keyway (in planes orthogonal to the radial axis A2) has the same shape.

Figure 6:
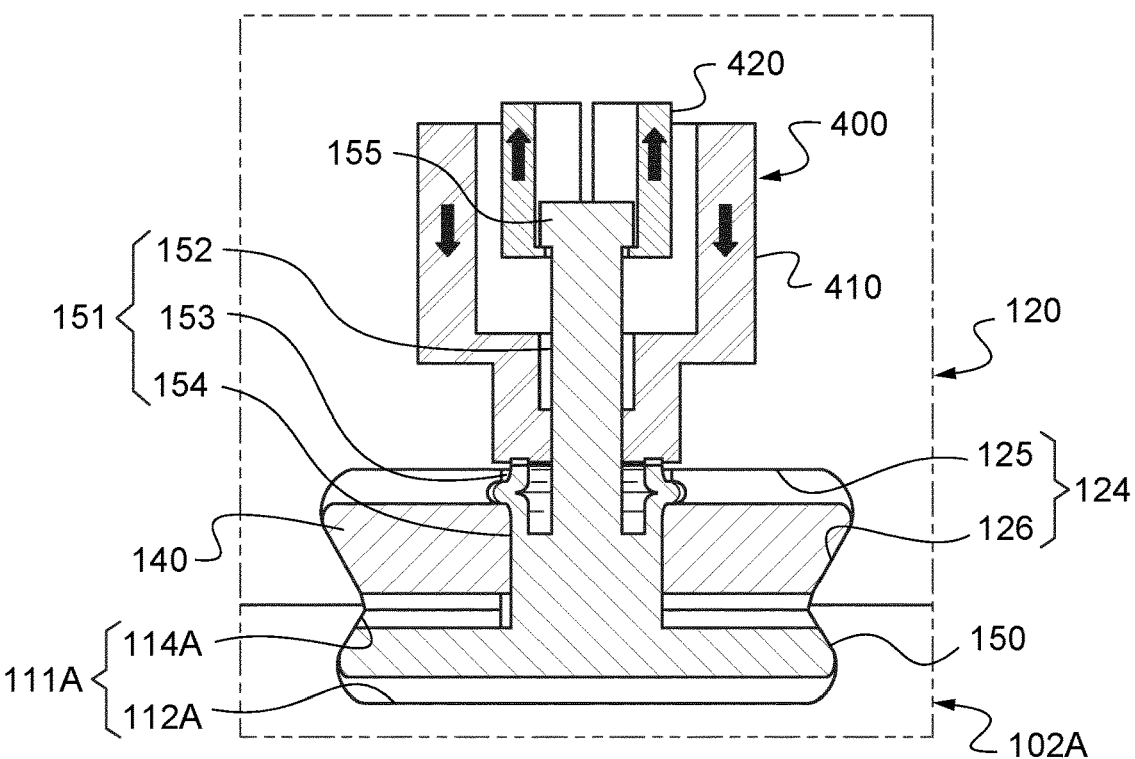
FIG. 6 is a schematic sectional view along the plane A-A of FIG. 5.

As shown in FIG. 6, the shape of this cross section is generally isosceles trapezoidal. The base of this trapezoid is located on the side of the head 123 of the tooth 120 while its top opens on the side of the half-casing 102A.

Thus, the keyway 124 has a flat bottom 125 and two side walls 126 inclined towards each other so that it opens downwards through a rectangular orifice whose width is less than that of the bottom 125.

It will be noted here that the ridges located on either side of the bottom 125 of the keyway 124 are rounded.

For its part, the half-casing 102A has, recessed in its face in contact with the tooth 120, a keyway 111A.

This keyway 111A extends in length along an axis parallel to the radial axis A2.

It is profiled along this radial axis A2. The shape of its cross section is identical to or close to that of the keyway 124 provided in the tooth 120, with a bottom 112A and two side edges 114A. Here, it has a size slightly smaller than that of the keyway 124. Its orifice, however, has a width identical to that of the orifice of the keyway 124.

When the tooth 120 is correctly positioned on the half-casing 102A, the two keyways 111A, 124 overlap exactly through their orifices. In this way, the cross section of this "keyway superposition" has a "bow tie" shape (see FIG. 6), arranged to accept the keys 140, 150. This keyway superposition 111A, 124 therefore has a variable width, which is maximum at its high and low ends and minimum at the height of the orifices.

The keys 140, 150 have the shape of prisms whose bases are trapezoids. Their forms will be described in more detail below.

If the key 140 to be installed in the keyway 124 of the tooth can be engaged therein easily, before the tooth 120 is attached to the half-casing 102A, the same is not true for the keys 150 to be engaged in the keyway 111A of the half-casing 102A. Indeed, the peripheral rim 106A and the internal flange 105 are potentially annoying.

This is the reason why the keys installed in the teeth and those installed in the half-casing have different shapes.

Thus, provision is here made of a single key 140 in the tooth 120 (hereinafter called long key 140) and several keys 150, preferably two, in the keyway 111A of the half-casing 102A (hereinafter called half-keys 150).

Figure 4:
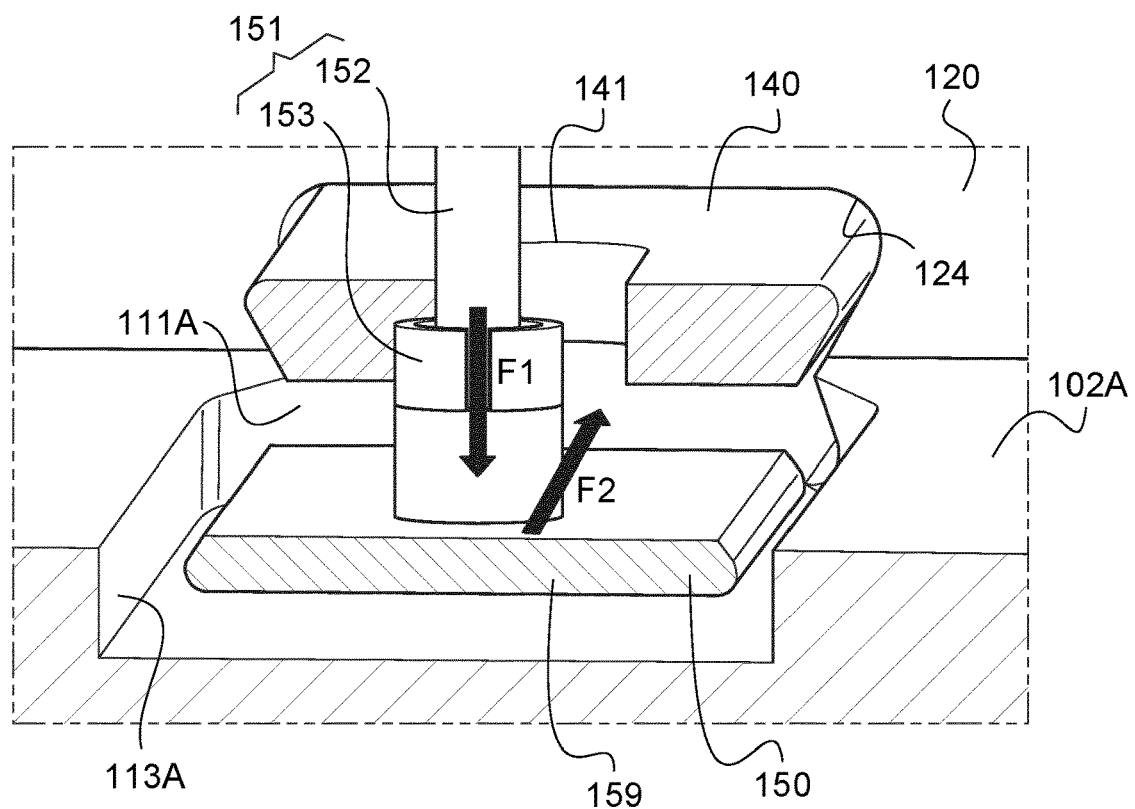
FIG. 4 is a schematic view of a detail illustrating the keys of the tooth and the fixing support before crimping.

As clearly illustrated in FIG. 4, specific means are provided here to allow the insertion of these half-keys 150 into the keyway 111A provided in the half-casing 102A.

In practice, it is planned that the keyway 111A extends on either side of the tooth 120, by an insertion ramp 113A.

These insertion ramps 113A are here provided in such a way that it is possible to engage the half-keys 150 from above (in the direction F1 parallel to the axis of rotation A1), before sliding these half-keys therein to the inside of the keyway 111A (in the direction F2 parallel to the radial axis A2).

Each insertion ramp 113A then extends in length along the radial axis A2 but it has a cross section which is not uniform. Thus, it has on the side of its end remote from the tooth 120, a section of rectangular shape which allows it to accept the half-key 150 in the direction F1. Then it has a section which gradually becomes trapezoidal towards its opposite end until it has a shape identical to that of the keyway 111A, so that the half-key 150 does not abut against any interference when it is slid in the direction F2.

In other words, the insertion ramp 113A has a bottom of width identical to that of the bottom of the keyway 111A, and two sides which gradually straighten from the keyway 111A towards its opposite end, at an angle of approximately 50 degrees to approximately an angle of 90 degrees.

Here, two ramps are therefore provided so as to be able to engage the two half-keys 150 in the keyway 111A when the tooth 120 is already in place on the half-casing 102A. Alternatively, a single ramp could have been provided, in which case at least one of the two half-keys 150 must be installed in the keyway 111A before the tooth 120 is placed on the half-casing 102A.

In FIG. 2, it is observed that a single keyway 111A is provided to accommodate the two half-keys 150. Alternatively, it could be provided that the keyway 111A is interrupted in its centre, and thus forms two coaxial keyways.

Note that in this FIG. 2, a single keyway 111A appears. In practice, for example, provision will be made of ten keyways 111A distributed in a star pattern on the half-casing 102A to accommodate as many teeth 120.

The particular shape of the long key 140 can now be described in more detail.

As shown in FIG. 2, the long key 140 has the shape of an elongated bar along the radial axis A2.

Thus, it has upper faces (turned on the tooth side) and lower faces (turned on the half-casing side) that are flat, rectangular and parallel. It also has two flat side faces but inclined relative to each other with an angle of inclination identical to the angle provided between the side walls 126 of the keyway 124 for receiving this long key. As clearly shown in FIGS. 5 to 7, the upper ridges of this long key 140 are rounded chamfered.

This long key 140 is profiled, that is to say it has a uniform section along the radial axis A2.

However, it has an opening at each of its ends. Here, this opening opens onto the end of the long key and therefore forms a notch 143.

The half-keys 150 have identical shapes, so that only one of the two can be described.

As shown in FIG. 4, this half-key 150 includes a body 159 which has the shape of a bar elongated along an axis parallel to the radial axis A2.

This body thus has upper faces (turned on the tooth side) and lower faces (turned on the half-casing side) that are flat, rectangular and parallel. It also has two flat side faces but inclined relative to each other with an angle of inclination identical to the angle provided between the side walls of the keyway 111A for receiving this half-key. The lower ridges of this half-key 150 are rounded chamfered.

This half-key 150 is profiled, that is to say that its body has a uniform section along the radial axis A2.

It is oriented in the opposite direction to the long key 140, so that its two side faces face upwards.

Means 151 are then provided to immobilise each half-key 150 in a fixed position with respect to the long key 140.

Here, these means are integrally formed with the body of the half-key 150.

Figure 7:
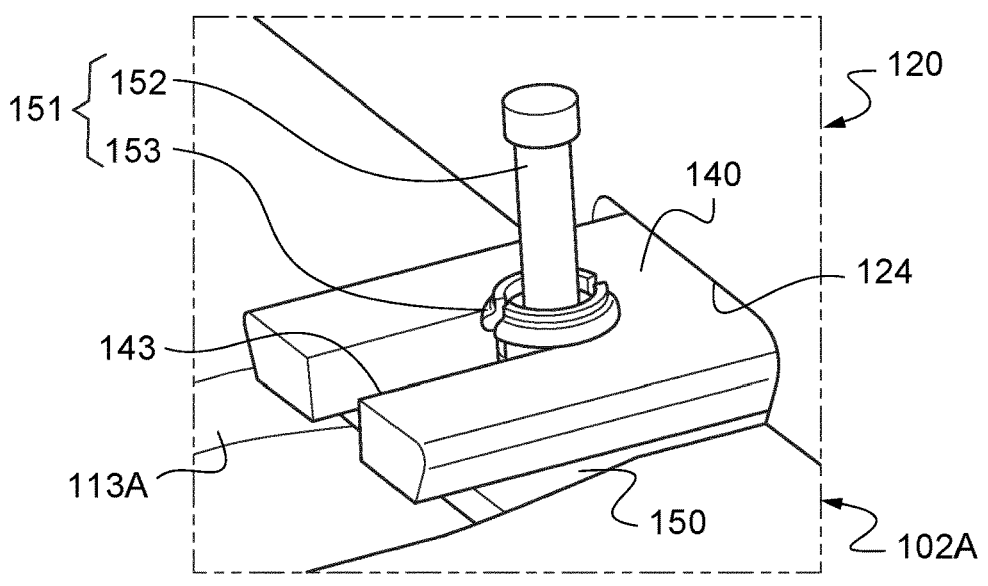
FIG. 7 is a schematic perspective view of the keys of the tooth and the fixing support once crimped.

As shown in FIGS. 4, 6 and 7, these are crimping means.

In FIG. 4, these means are shown before crimping, while they are shown crimped in the other figures.

As better shown in FIG. 6, these means include a cylindrical pin 154 which rises from the upper face of the body of the half-key 150, orthogonally thereto.

They also include a cylindrical rod 152 which rises from the upper end of the cylindrical pin 154, in the axis of the latter, and which has a diameter less than the diameter of this pin. This rod 152 includes an upper end which has an enlarged section forming a grip 155.

They finally include a tubular crown 153 which rises from the upper end of the cylindrical pin 154, in the extension of the latter, around the rod 152, and which is elastically deformable.

In practice, the half-keys here are made of a metallic material.

This crown 153 is then intended to be engaged in one of the notches 143 (see FIGS. 5 and 7) of the long key 140 and to be crimped above it in order to form a bulge which immobilises the keys with respect to each other. This crimping operation thus allows to pull the keys towards each other.

Figure 5:
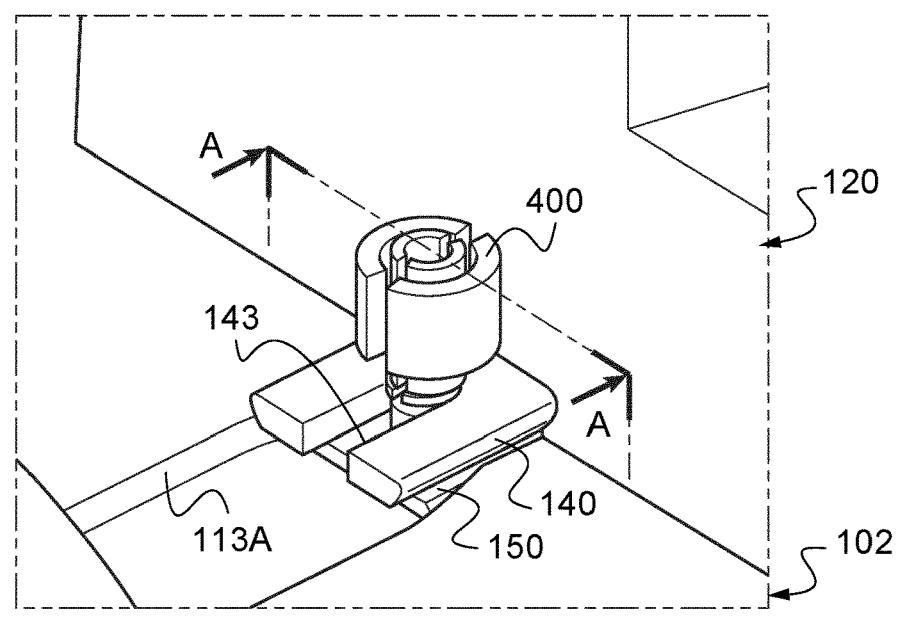
FIG. 5 is a schematic perspective view of the head of a tool for crimping the keys of the tooth and the fixing support.

To facilitate this operation, it is observed in FIGS. 5 and 7 that the crown is split axially in two diametrically opposite locations.

The head 400 of the tool enabling the crimping operation is shown in FIGS. 5 and 6.

This head 400 includes two parts 410, 420 movable in translation relative to each other, one of which is designed to be hooked to the grip 155 of the rod 152 and the other which is designed to push back, like a press, the crown 153 so as to form the aforementioned bead.

A method for assembling one of the stator bodies 101A can now be described.

Figure 3:
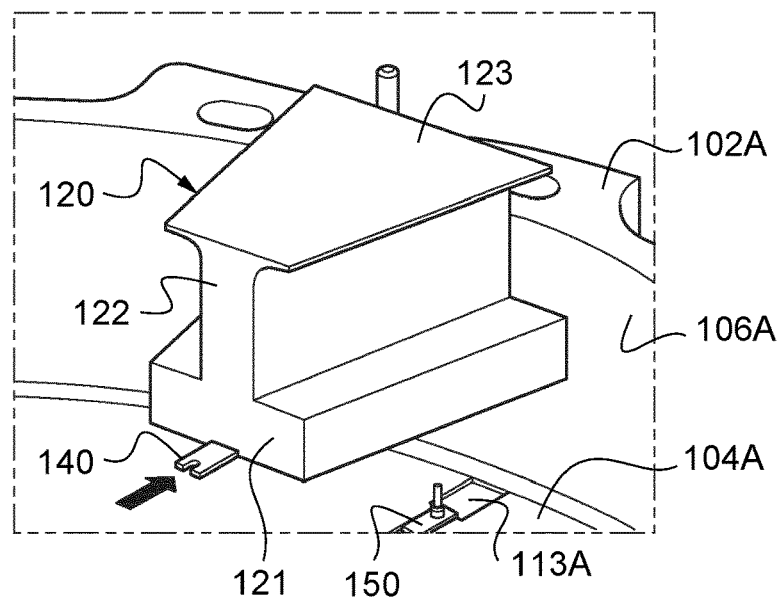
FIG. 3 is a schematic view of the tooth and the part of the fixing support of FIG. 2, before assembly and after placement of the keys of the tooth and the fixing support.

During a first step illustrated in FIGS. 2 and 3, the long key 140 is engaged in the keyway 124 of one of the teeth 120, making it slide until its two ends protrude on either side of the tooth 120.

During a second step, the half-keys 150 are positioned in the insertion ramps 113A of one of the keyways 111A of the half-casing 102A, then they are pushed towards each other in order to enter in this keyway 111A.

During a third step (which could alternatively be implemented before the second step), the tooth 120 is positioned against the bottom 104A of the half-casing 102A, so that the keyway 124 provided in this tooth 120 is superimposed above the keyway 111A. During this operation, as shown in FIG. 4, the positions of the half-keys 150 are adjusted so that the crowns 153 of the half-keys 150 are placed in the notches 143 of the long key 140.

At this step, the body of the half-key 150 is not in contact with the long key 140, but there is a clearance between these two elements.

Then, during a fourth step illustrated in FIGS. 5 and 6, the head 400 of the tool is successively placed on the rod 152 of each half-key 150 so as to crimp the crowns 153 of the two half-keys 150 on the edges of the notches 143 of the long key 140. Thus the tooth 120 is then securely fixed to the half-casing 102A.

The aforementioned clearance allows, during the crimping operation, to force the long key 140 towards the half-keys 150. Thanks to this, the fixing of each tooth is sufficiently solid to resist the vibratory stresses which will be exerted thereon during the operation of the electric machine 10.

These four steps are repeated for each of the other teeth 120.

The present invention is in no way limited to the embodiment described and represented, but the person skilled in the art will be able to make any variation in accordance with the invention.

For example, the invention could be applied to a radial flux electric machine, in which case the support for fixing the teeth could be formed by the peripheral rim of the half-casing.

According to another variant, a fixing support could have been provided for the teeth which is separate from the casing, and which then includes keyways for receiving the half-keys and means for fixing to the casing.

In another variant, the immobilising means 151 are replaced by rivets, the tool 400 then serving to rivet these rivets onto the long key 140.

Figure 8:
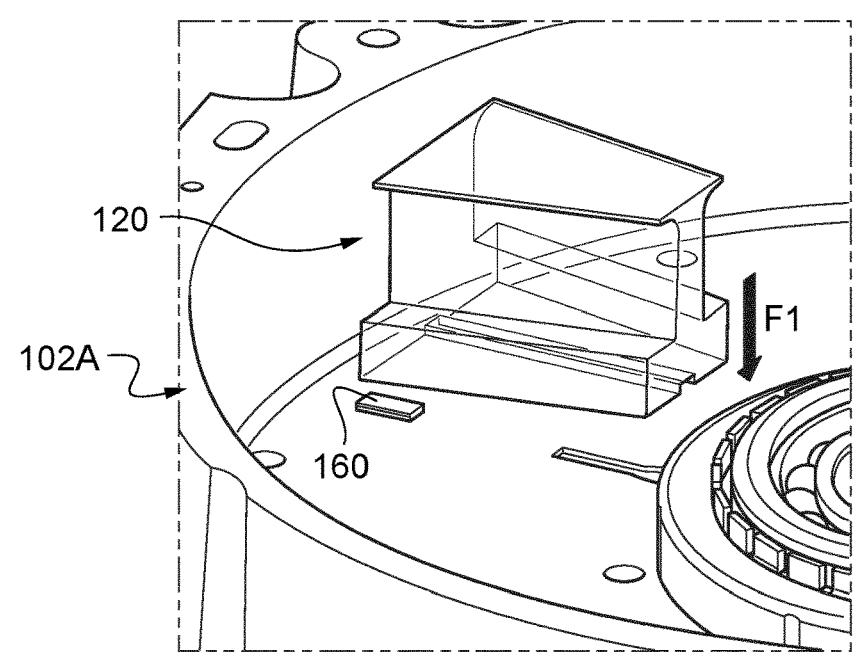
FIG. 8 is a schematic view of a tooth and part of a fixing support in accordance with a second embodiment of the electric machine of FIG. 1, before assembly, on which the tooth was shown in a transparent manner.
Figure 9:
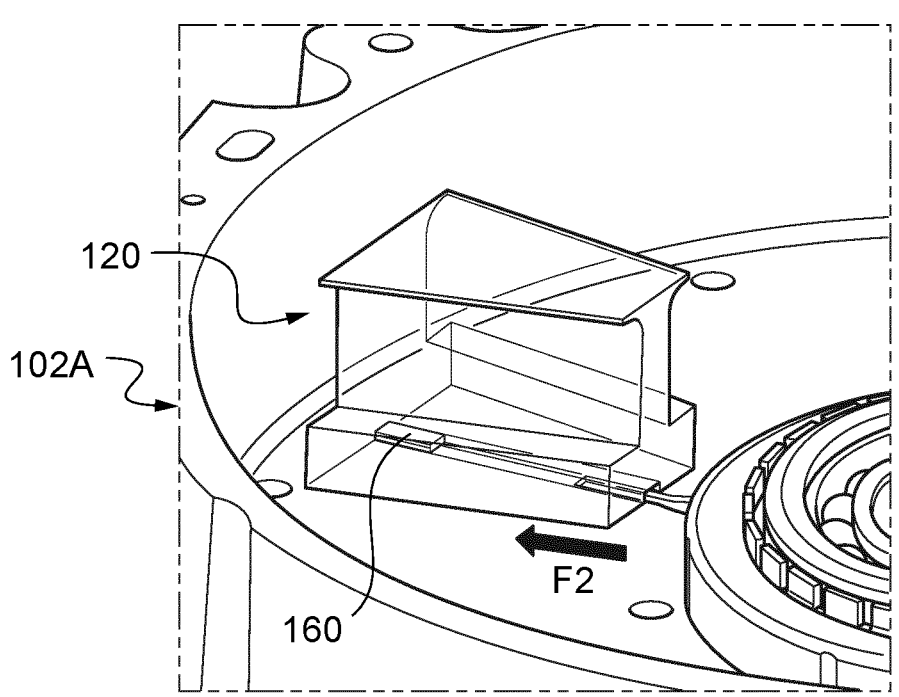
FIG. 9 is a schematic view of the tooth and the part of the fixing support of FIG. 8, during assembly, on which the tooth was shown transparently.

In FIGS. 8 and 9, a second embodiment of the invention is shown. In this second embodiment, the tooth 120 is designed to be retained on one side by a half-key and by a long half-key (not shown).

On the other hand, the tooth is intended to be retained on the other side (here outer side) by a relief 160 which is integrally formed with the bottom 104A of the half-casing 102 and which has a shape identical to that of a section of the long key 140. Thus, this relief 160 has a cross section in the shape of a dovetail.

In this second embodiment, the method for assembling the stator body is a little different from that explained above.

Thus, during a first step illustrated in FIG. 8, the tooth 120 equipped with its long half-key 140 (not illustrated in the figures) is positioned on the half-casing 102A. For this purpose, the tooth 120 is first placed against this half-casing, by a first longitudinal movement (arrow F1) so that one of the ends of its keyway 124 opens facing the relief 160. It is then moved radially by a second movement (arrow F2 in FIG. 9) to engage the keyway 124 of the tooth 120 on this relief 160.

During a second step, the tooth 120 is fixed on the inner side using a half-key 150 crimped on the long half-key, in the same way as in the first embodiment.

Alternatively, the relief 160 could have a different shape, provided that it allows the tooth 120 to be hooked. For example, it could have the shape of a hook designed to hook the tooth.

The invention claimed is:

1. A stator body for an electric machine, comprising:
   at least one fixing support centred on a longitudinal axis, teeth which are designed to accept coils of electrically conducting wire and which are uniformly distributed about the longitudinal axis, and fixing means each suitable for fixing one of said teeth to the fixing support, wherein each fixing means comprises:

at least one first key at least partially housed in a first keyway provided in the tooth, at least one second key at least partially housed in a second keyway provided in the fixing support, and at least one immobilising element designed to immobilise the first key with respect to the second key.

2. The stator body according to claim 1, wherein each first and second keyway has a bottom and two side walls inclined towards each other which together delimit an elongated orifice of less width than the bottom, the orifice of the first keyway being superimposed on the orifice of the second keyway.

3. The stator body according to claim 1, wherein the first keyway opens on either side of the tooth, the first key projects on either side of the tooth and the immobilising element is accessible from the side of the tooth.

4. The stator body according to claim 1, wherein two separate second keys, housed in the same second keyway or in two second coaxial keyways, are provided.

5. The stator body according to claim 1, wherein the immobilising element is designed to exert a tensile force from the first key towards the second key.

6. The stator body according to claim 1, wherein the immobilising element includes a plastically deformable part which is integrally formed with the second key and wherein the first key delimits a passage for the plastically deformable part, on the edge of which the plastically deformable part is designed to be crimped.

7. The stator body according to claim 1, wherein the second keyway is extended by an insertion ramp the cross section of which gradually widens from the second keyway.

8. The stator body according to claim 1, wherein the fixing support forms part of a casing of a stator.

9. The stator body according to claim 1, wherein each fixing also includes a relief which extends projecting or recessed from the fixing support and to which is hooked on the tooth.

10. An electric machine including a rotor and two stator bodies in accordance with claim 1, located on either side of the rotor.

11. A method for assembling a stator body in accordance with claim 1, comprising:

a step of inserting the first key into the first keyway provided in the tooth, a step of engaging each second key in the second keyway provided in the fixing body, after the insertion step, a step of placing the tooth resting against the fixing support, so that the first keyway is superimposed above the second keyway, and after the placement step and the engagement step, a step of immobilising the first key on the second key using the immobilising element.

12. The assembly method according to claim 11, wherein the immobilisation step is implemented by crimping the immobilising element.

* * * * *